(12) United States Patent
Onodera et al.

(10) Patent No.: US 9,688,087 B2
(45) Date of Patent: Jun. 27, 2017

(54) INK JET PRINTER AND PRINT METHOD

(71) Applicant: MIMAKI ENGINEERING CO., LTD., Nagano (JP)

(72) Inventors: Akihiro Onodera, Tokyo (JP); Masashi Hirano, Tokyo (JP); Toshihiro Sanuki, Tokyo (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/421,151

(22) PCT Filed: Aug. 23, 2013

(86) PCT No.: PCT/JP2013/072518
§ 371 (c)(1),
(2) Date: Feb. 12, 2015

(87) PCT Pub. No.: WO2014/034545
PCT Pub. Date: Mar. 6, 2014

(65) Prior Publication Data
US 2015/0202902 A1    Jul. 23, 2015

(30) Foreign Application Priority Data

Aug. 27, 2012 (JP) .................. 2012-186789
Oct. 24, 2012 (JP) .................. 2012-234435

(51) Int. Cl.
*B41J 3/407* (2006.01)
*B41J 23/00* (2006.01)
(Continued)

(52) U.S. Cl.
CPC ............... *B41J 23/00* (2013.01); *B33Y 30/00* (2014.12); *B41J 2/14* (2013.01); *B41J 3/4073* (2013.01); *B41J 11/20* (2013.01); *B41M 5/0088* (2013.01)

(58) Field of Classification Search
CPC . B41J 3/4073; B41J 3/283; B41J 3/286; B41J 19/202; B41J 25/34
(Continued)

(56) References Cited

U.S. PATENT DOCUMENTS 5,632,205 A * 5/1997 Gordon ................... B41F 17/30
101/483
6,890,491 B1 * 5/2005 Feygin et al. ................. 422/130
(Continued)

FOREIGN PATENT DOCUMENTS

CN    100999152    7/2007
CN    101259798    9/2008
(Continued)

OTHER PUBLICATIONS

"International Search Report (Form PCT/ISA/210)", mailed on Oct. 1, 2013, with English translation thereof, pp. 1-4.
(Continued)

*Primary Examiner* — Julian Huffman
*Assistant Examiner* — Sharon A Polk
(74) *Attorney, Agent, or Firm* — Jianq Chyun IP Office

(57) ABSTRACT

An ink jet printer that performs printing on the three-dimensional object using an ink jet scheme is provided, the printer includes an ink jet head, and a print object retaining section, the print object retaining section includes a first shaft, a second shaft, a third shaft, and a rotation driving section, a distance between the first shaft and the second shaft is larger than a distance between the first shaft and the third shaft, and in a case of performing printing on a three-dimensional object having a cylindrically shaped portion, the print object retaining section retains the three-dimensional object by mounting the cylindrically shaped portion on the first shaft and the second shaft, or on the first shaft and the third shaft, and the rotation driving section
(Continued)

causes the three-dimensional object to rotate by causing at least the first shaft to rotate.

11 Claims, 9 Drawing Sheets

(51) Int. Cl.
     *B33Y 30/00*       (2015.01)
     *B41J 11/20*       (2006.01)
     *B41J 2/14*       (2006.01)
     *B41M 5/00*       (2006.01)

(58) Field of Classification Search
     USPC .......................................................... 347/37
     See application file for complete search history.

(56) References Cited

U.S. PATENT DOCUMENTS

| | | | |
|---|---|---|---|
| 2001/0019340 A1 | 9/2001 | Kubo et al. | |
| 2002/0134257 A1* | 9/2002 | Stephenson | B41J 3/4073 101/35 |
| 2005/0178279 A1* | 8/2005 | Valls | B41J 3/4073 101/38.1 |
| 2005/0270351 A1 | 12/2005 | Mouri et al. | |
| 2009/0073200 A1* | 3/2009 | Tezuka et al. | 347/9 |
| 2009/0255423 A1* | 10/2009 | Valls | B41J 3/4073 101/110 |
| 2011/0249048 A1* | 10/2011 | Gullentops et al. | 347/5 |
| 2013/0342592 A1* | 12/2013 | Merz | 347/2 |

FOREIGN PATENT DOCUMENTS

| | | |
|---|---|---|
| JP | 08-207265 | 8/1996 |
| JP | 10-278241 | 10/1998 |
| JP | 2001-239660 | 9/2001 |
| JP | 2001-347656 | 12/2001 |
| JP | 2005-343049 | 12/2005 |
| JP | 2007-185960 | 7/2007 |
| JP | 2008-168594 | 7/2008 |
| JP | 2012-086511 | 5/2012 |

OTHER PUBLICATIONS

"The Extended European Search Report", issued on Jun. 26, 2015, pp. 1-4.

"1st Office Action of China Counterpart Application", issued on Sep. 21, 2015, p. 1-p. 10, with English translation thereof.

* cited by examiner

INK JET PRINTER AND PRINT METHOD

CROSS-REFERENCE TO RELATED APPLICATION

This application is a 371 application of the International PCT application serial no. PCT/JP2013/072518, filed on Aug. 23, 2013, which claims priority benefits of Japan Patent Application No. 2012-186789, filed on Aug. 27, 2012, and Japan Patent Application No. 2012-234435, filed on Oct. 24, 2012. The entirety of each of the above-mentioned patent applications is hereby incorporated by references herein and made a part of this specification.

TECHNICAL FIELD

The present invention relates to an ink jet printer, a printing object-holding member and a printing method.

BACKGROUND ART

In the recent years, a print target of an ink jet printer is not limited to a flat-shaped medium such as paper, film, and the like, but broader application to three-dimensional objects with various shapes is being made. Further, accompanying this, methods for retaining a print object (work piece) having various shapes are being considered. For example, conventionally, a print device that performs printing on a surface of a cylindrical print object is known (for example, see Patent Document 1). The print device described in Patent Document 1 is provided with an adjusting retaining mechanism for adjusting and retaining a cylindrical print object, a supporting unit provided on the adjusting retaining mechanism and for rotatably supporting the cylindrical print object about a center axis thereof, and a rotation driving unit for rotatably driving the cylindrical print object, in order to keep an interval between a surface and a print head to be at a predetermined distance in a surface passing through the center axis of the cylindrical print object.

PRIOR ART DOCUMENT

Patent Document

Patent Document 1: JP H 8-207265 A

SUMMARY OF THE INVENTION

Problem to be Solved by the Invention

To perform highly accurate printing by an ink jet printer, a distance between an ink jet head and a print object needs to be sufficiently small. For example, in a case of performing printing with high accuracy of 600 dpi or more, a distance (gap distance) between a position where an ink droplet is to strike (striking position) and an ink jet head needs to be set at about 1.5 mm or less (for example, 1.0 to 1.5 mm).

Further, in a case where a work piece is a three-dimensional object, a mere fixation may not be able to keep a constant gap distance in some cases, depending on a surface shape pattern of the three-dimensional object. Due to this, in performing printing on the three-dimensional object, it is important to retain the work piece by a method suitable for the shape thereof. Thus, the inventor of the present application has conducted in-depth study on how a work piece should be retained in performing printing using an ink jet printer on a three-dimensional object having a cylindrically shaped portion, such as a bottle, for example.

In performing printing on a cylindrically shaped portion of the work piece, printing may be attempted to be performed while rotating the work piece. Further, as a method therefor, one may consider to use a method disclosed for example in Patent Document 1. In this method, as can be understood from a configuration and the like shown in FIG. 3 of Patent Document 1, a distance between support rollers (408, 410) is made variable by rotating bar-shaped link elements (320, 322) relative to a pivot (312), so as to realize a configuration that can support work pieces (cylindrical print objects) with various radii (diameters).

However, in a case of such a configuration, positions of the support rollers in a height direction change when the distance between the support rollers is adjusted. Due to this, in the case of changing the distance between the support rollers, a need to consider the positions thereof in the height direction is generated. Further, as a result, restriction may undesirably be generated on the setting of the distance between the support rollers.

Further, in a case where a work piece is mounted on the support rollers, the two support rollers receive a force acting in a direction that widens the distance between the support rollers. Further, in the case of the configuration of Patent Document 1, due to the characteristic of the configuration that rotates the bar-shaped link elements relative to the pivot, this force may undesirably widen the distance between the two support rollers. Further, as a result, in a case of performing printing for example in a production process for industrial products and the like, an error may undesirably be generated in the distance between the support rollers by continuing printing on large mass of products over a long time.

Further, in the configuration of Patent Document 1, if such an error is generated in the distance between the support rollers, an error is generated also in the positions of the support rollers in the height direction. As a result, a suitable gap distance can no longer be kept, and highly accurate and suitable printing may not be able to be performed.

Due to this, conventionally, a method for more appropriately performing printing on a three-dimensional object having a cylindrically shaped portion using an ink jet printer has long been desired. Thus, the present invention aims to provide an ink jet printer, a print object retaining member, and a print method that can solve the above problem.

Solutions to the Problem

To solve the above problem, the present invention has the following configurations.

(Configuration 1) An ink jet printer configured to perform printing on a three-dimensional object using an ink jet scheme is provided, the ink jet printer including an ink jet head that discharges ink droplets and a print object retaining section that retains the three-dimensional object by making the three-dimensional object face the ink jet head, the print object retaining section includes a shaft-shaped first shaft extending in a direction that perpendicularly intersects with a direction along which the ink jet head discharges the ink droplets, a shaft-shaped second shaft extending in parallel with the first shaft, a shaft-shaped third shaft that extends in parallel with the first shaft on an opposite side from the second shaft relative to the first shaft, and a rotation driving section that causes at least the first shaft to rotate, a distance between the first shaft and the second shaft is larger than a distance between the first shaft and the third shaft, and in a case of performing printing on the three-dimensional object having a cylindrically shaped portion, the print object retaining section retains the three-dimensional object by mounting the cylindrically shaped portion on the first shaft and the second shaft or on the first shaft and the third shaft, the ink jet head is provided at a position facing the side surface of the cylindrically shaped portion of the three-dimensional object mounted on the first shaft and the second shaft or on the first shaft and the third shaft, and the rotation driving section causes the three-dimensional object to rotate by causing at least the first shaft to rotate.

By configuring as above, for example, in the case of performing printing on the three-dimensional object having the cylindrically shaped portion, the three-dimensional object can appropriately be retained in the state where the cylindrically shaped portion is caused to face the ink jet head. Further, the three-dimensional object can be rotated by having the rotation driving section rotate at least the first shaft, and a region on the three-dimensional object facing the ink jet head can be changed successively. Further, due to this, for example, the printing can be performed appropriately to an entirety of the cylindrically shaped portion of the three-dimensional object.

Moreover, as to the position to mount the three-dimensional object, the position on the first shaft and second shaft or on the first shaft and third shaft can be selected according to a diameter of the three-dimensional object. Due to this, by configuring as above, the printing can be performed appropriately on three-dimensional objects with various diameters.

Notably, the configuration corresponding to the print object retaining section can for example be said as being a rotation device for a print object for ink jet printing that mounts the print object on two lengthy-shaped shafts and performs printing on the print target object while rotating the same. Further, in this case, as for the configuration of the rotation device for a print object for ink jet printing, for example, it can be said that it is characteristic in that one of the shafts may be a driving shaft that causes the print target object to rotate, a second shaft (for example, a driven shaft) may be provided on one side with the driving shaft as a center, a third shaft (for example, a driven shaft) may be provided on the other side, and a distance between the driving shaft and the second shaft and a distance between the driving shaft and the third shaft are made to differ. In this case, the driving shaft is for example a configuration corresponding to the first shaft. Further, each of the second shaft and the third shaft is for example a configuration corresponding to each of the second shaft and the third shaft. Further, as for the second shaft and the third shaft also, they may be driving shafts.

As to this configuration also, for example, due to the distance between the driving shaft and the second shaft and the distance between the driving shaft and the third shaft being different, it can be said that a size of the print object (print target object) to be mounted can be selected in accordance with the distances. Further, due to this, it can be said that printing can be performed on various print objects, from a large print object to a small print object. Moreover, in this case, since supporting positions of the driving shaft, the second shaft, and the third shaft can be fixed, in the case where the print object is for example cylindrical or the like, the diameter of the print object can accurately be obtained if the inter-axis distance and the height from the axis of the print object are known. Further, since the printing region can hereby be identified accurately, for example, an end position of printing can accurately be controlled.

(Configuration 2) The rotation driving section rotates only the first shaft among the first shaft, the second shaft, and the third shaft, in the case where the cylindrically shaped portion of the three-dimensional object is mounted on the first shaft and the second shaft, the second shaft rotates in accordance with rotation of the three-dimensional object, and in the case where the cylindrically shaped portion of the three-dimensional object is mounted on the first shaft and the third shaft, the third shaft rotates in accordance with the rotation of the three-dimensional object.

By configuring as above, for example, the three-dimensional object being the printing target can appropriately be rotated. Further, due to this, for example, printing can be performed appropriately to an entirety of the cylindrically shaped portion of the three-dimensional object. Further, by configuring the second shaft and the third shaft as driven shafts, the device configuration can be more simplified.

(Configuration 3) The rotation driving section includes a stepping motor and a timing belt that causes the first shaft to rotate in accordance with rotation of the stepping motor. By configuring as above, for example, a rotation amount of the first shaft can appropriately be controlled with high accuracy. Further, due to this, printing on the three-dimensional object having the cylindrically shaped portion can appropriately be performed with even higher accuracy.

(Configuration 4) A retaining section-driving section that moves the print object retaining section relative to the ink jet head in the direction along which the ink jet head discharges the ink droplets is further provided, and the retaining section-driving section moves the print object retaining section relative to the ink jet head so that a distance between the ink jet head and a position where a ink droplet strikes on the three-dimensional object upon printing onto the first print surface is in a range of 1.0 to 1.5 mm.

By configuring as above, printing on the three-dimensional object can more appropriately be performed with high accuracy. Further, by clearly dividing a function to perform an up and down movement that is an operation in the direction along which the ink jet head discharges the ink droplets (discharging direction) and a function to cause the three-dimensional object to rotate, control of each of the functions can more appropriately and easily be performed. Further, due to this, printing on the three-dimensional object having the cylindrically shaped portion can appropriately be performed with even higher accuracy.

Notably, it can be said that the configuration corresponding to the retaining section-driving section is, for example a lifting member. Further, in this case, the configuration of the rotation device of the print object for ink jet printing is considered as being a configuration including the lifting member, and it can be said that it is characteristic in having a supporting member on which a supporting section that supports for example the first shaft being the driving shaft and the second shaft and the third shaft being the one and the other driven shafts, and the like is formed; and the lifting member that moves the supporting member up and down in a direction of gravity.

Further, as for this configuration also, for example, it can be said that the height of the print object can be adjusted while fixing the positions for supporting the first shaft and the second and third shafts. Further, due to this, since the gap distance between the print object and the ink jet head can be adjusted to the optimal value, it can be said that print quality can appropriately be improved.

(Configuration 5) The ink jet head includes a base coating head that performs printing of a base coat on the three-dimensional object and a drawing head that draws on the base coat, the base coating head and the drawing head are arranged so as to be adjoined in an array direction that intersects perpendicularly with an axial direction of the first shaft, and in a case of projecting to a plane parallel to the axial direction of the first shaft and the array direction, a center portion of the base coating head and the drawing head in the array direction overlaps with a center axis of the cylindrically shaped portion of the three-dimensional object.

In case of performing the printing on the three-dimensional object, for example, some cases perform base coat printing by white ink or the like, and draw a design thereon. Further, in this case, the base coating head and the drawing head may be thought to be used as the ink jet head.

Thus, the inventor of the present application has conducted an in-depth study on a preferable arrangement of the base coating head and the drawing head relative to the three-dimensional object in the case of performing printing on the three-dimensional object having the cylindrically shaped portion. Then, by this in-depth study, it has been found that the above configuration is preferable. By configuring as above, for example, the printings by the base coating head and the drawing head can both be performed appropriately with high accuracy. Further, due to this, the printing on the three-dimensional object having the cylindrically shaped portion can appropriately be performed with even higher accuracy.

(Configuration 6) The ink jet head includes a base coating head that performs printing of a base coat on the three-dimensional object and a drawing head that draws on the base coat, the base coating head and the drawing head are arranged so as to be adjoined in an array direction that intersects perpendicularly with an axial direction of the first shaft, and a distance between a striking position of an ink droplet that the base coating head discharges and the base coating head is equal to a distance between a striking position of an ink droplet that the drawing head discharges and the drawing head.

By configuring as above, for example, the printings by the base coating head and the drawing head can both be performed appropriately with high accuracy. Further, due to this, the printing on the three-dimensional object having the cylindrically shaped portion can appropriately be performed with even higher accuracy.

(Configuration 7) The rotation driving section causes at least the first shaft and the third shaft to rotate. The rotation driving section for example may rotate the third shaft by interlocking the same with the first shaft. Further, the rotation driving section may further cause the second shaft to rotate.

For example, in the case where only the first shaft is configured as the driving shaft and the second shaft and the third shaft are configured as the driven shafts, the driven shafts rotate in accordance with rotation of the three-dimensional object. However, in this case, for example, if the weight of the three-dimensional object is light, there are cases where the driven shafts are not caused to rotate appropriately. Further, as a result, the three-dimensional object itself becomes unable to rotate appropriately, and an influence on a printing result may be generated in some cases. Especially, in the case of mounting a small-diameter three-dimensional object on the first shaft and the third shaft with a narrow gap, the weight may not be insufficient, whereby such a problem tends to occur.

With respect to this, by configuring as above, for example, even in the case of mounting a light-weighted three-dimensional object on the first shaft and the third shaft with a narrow gap, the three-dimensional object can more appropriately be caused to rotate. Further, due to this, the printing on the three-dimensional object can be performed more appropriately. Notably, the three-dimensional object being the print target for example may be a three-dimensional object having the cylindrically shaped portion with a diameter of 1 to 4 cm. More specifically, for example, it may be a signature stamp, or a beverage can (especially, an empty can).

(Configuration 8) The rotation driving section includes: a stepping motor; a first belt that causes the first shaft to rotate in accordance with rotation of the stepping motor; and a second belt that causes the third shaft to rotate in accordance with rotation of the first shaft. By configuring as above, for example, the first shaft and the third shaft can appropriately be caused to rotate by the rotation driving section.

As the first belt and the second belt, for example, timing belts may suitably be used. Further, each of the first belt and the second belt is respectively provided for example, on one end side and the other end side of the first shaft. In this case, the first belt causes the first shaft to rotate by transmitting the motive power of the stepping motor to the one end side of the first shaft, for example. The second belt for example causes the third shaft to rotate in accordance with rotation of the first shaft by connecting the other end side of the first shaft with the third shaft. Notably, the first belt may cause the first shaft to rotate for example by causing a pulley attached to the one end side of the first shaft to rotate. The second belt may connect the other end side of the first shaft with the third shaft by connecting a pulley attached to the other end side of the first shaft with a pulley attached to the third shaft.

(Configuration 9) The second belt is a ring-shaped belt, and causes the second shaft and the third shaft to rotate in accordance with rotation of the first shaft by being provided in a state of having the first shaft, the second shaft, and the third shaft installed inside the ring, the rotation driving section further includes a tension adjusting member that adjusts tension of the second belt by changing a position to make contact with the second belt, and the tension adjusting member makes contact with the second belt between the first shaft and the second shaft.

In configuring as above, even in the case of mounting the light-weighted three-dimensional object on the first shaft and the second shaft, the three-dimensional object can be caused to rotate more appropriately also by configuring the second shaft as a driving shaft. Further, due to this, for example, printing can be performed more appropriately even on a three-dimensional object having a large diameter and light weight.

Further, in configuring as above, by using the tension adjusting member, the tension of the second belt can be adjusted appropriately. Moreover, in the configuration that provides the second shaft and the third shaft by sandwiching the first shaft, the tension adjusting member is provided between the first shaft and the second shaft with the wider gap so that space between shafts can be used efficiently.

Notably, as the tension adjusting member, for example, an idling pulley (idler) can suitably be used. Further, in this case, a position of the idling pulley can be adjusted to appropriately adjust the tension of the second belt.

(Configuration 10) A member to be used for an ink jet printer configured to perform printing on a three-dimensional object using an ink jet scheme is provided, the member is a print object retaining member that retains a three-dimensional object being a printing target by making the three-dimensional object face a ink jet head and includes a shaft-shaped first shaft extending in a direction that perpendicularly intersects with a direction along which the ink jet head discharges the ink droplets, a shaft-shaped second shaft extending in parallel with the first shaft, a shaft-shaped third shaft that extends in parallel with the first shaft on an opposite side from the second shaft relative to the first shaft, and a rotation driving section that causes at least the first shaft to rotate, a distance between the first shaft and the second shaft is larger than a distance between the first shaft and the third shaft, and in a case of performing printing on the three-dimensional object having a cylindrically shaped portion, the print object retaining member retains the three-dimensional object by mounting the cylindrically shaped portion on the first shaft and the second shaft, or on the first shaft and the third shaft, the ink jet head is provided at a position facing the side surface of the cylindrically shaped portion of the three-dimensional object mounted on the first shaft and the second shaft, or on the first shaft and the third shaft, and the rotation driving section causes the three-dimensional object to rotate by causing at least the first shaft to rotate. By configuring as above, for example, the same effect as that of Configuration 1 can be achieved.

(Configuration 11) A print method for performing printing on a three-dimensional object using an ink jet scheme is provided, the print method uses an ink jet head that discharges ink droplets and a print object retaining member that retains the three-dimensional object by making the three-dimensional object face the ink jet head, the print object retaining member includes a shaft-shaped first shaft extending in a direction that perpendicularly intersects with a direction along which the ink jet head discharges the ink droplets, a shaft-shaped second shaft extending in parallel with the first shaft, a shaft-shaped third shaft that extends in parallel with the first shaft on an opposite side from the second shaft relative to the first shaft, and a rotation driving section that causes at least the first shaft to rotate, a distance between the first shaft and the second shaft is larger than a distance between the first shaft and the third shaft, and in a case of performing printing on the three-dimensional object having a cylindrically shaped portion, the print object retaining member retains the three-dimensional object by mounting the cylindrically shaped portion on the first shaft and the second shaft or on the first shaft and the third shaft, the ink jet head is provided at a position facing the side surface of the cylindrically shaped portion of the three-dimensional object mounted on the first shaft and the second shaft or on the first shaft and the third shaft, and the rotation driving section causes the three-dimensional object to rotate by causing at least the first shaft to rotate. By configuring as above, for example, the same effect as that of Configuration 1 can be achieved.

(Configuration 12) An ink jet printer configured to perform printing on a three-dimensional object using an ink jet scheme is provided, the ink jet printer includes an ink jet head that discharges ink droplets and a print object retaining section that retains the three-dimensional object by making the three-dimensional object face the ink jet head, the print object retaining section includes a shaft-shaped first shaft extending in a direction that perpendicularly intersects with a direction along which the ink jet head discharges the ink droplets, a shaft-shaped second shaft extending in parallel with the first shaft, and a rotation driving section that causes at least the first shaft to rotate, in a case of performing printing on the three-dimensional object having a cylindrically shaped portion, the print object retaining section retains the three-dimensional object by mounting the cylindrically shaped portion on the first shaft and the second shaft, the ink jet head is provided at a position facing the side surface of the cylindrically shaped portion of the three-dimensional object mounted on the first shaft and the second shaft, the rotation driving section causes the three-dimensional object to rotate by causing at least the first shaft to rotate, and the ink jet head includes a base coating head that performs printing of a base coat on the three-dimensional object and a drawing head that draws on the base coat, the base coating head and the drawing head are arranged so as to be adjoined in an array direction that intersects perpendicularly with an axial direction of the first shaft, and in a case of projecting to a plane parallel to the axial direction of the first shaft and the array direction, a center portion of the base coating head and the drawing head in the array direction overlaps with a center axis of the cylindrically shaped portion of the three-dimensional object.

By configuring as above, for example, the printings by the base coating head and the drawing head can both be performed appropriately with high accuracy. Further, due to this, printing on the three-dimensional object having the cylindrically shaped portion can be performed appropriately with high accuracy.

(Configuration 13) A member to be used for an ink jet printer configured to perform printing on a three-dimensional object using an ink jet scheme is provided, the member is a print object retaining member that retains a three-dimensional object by making the three-dimensional object face a ink jet head, and includes a shaft-shaped first shaft extending in a direction that perpendicularly intersects with a direction along which the ink jet head discharges the ink droplets, a shaft-shaped second shaft extending in parallel with the first shaft, and a rotation driving section that causes at least the first shaft to rotate, in a case of performing printing on the three-dimensional object having a cylindrically shaped portion, the print object retaining member retains the three-dimensional object by mounting the cylindrically shaped portion on the first shaft and the second shaft, the ink jet head is provided at a position facing the side surface of the cylindrically shaped portion of the three-dimensional object mounted on the first shaft and the second shaft, and the rotation driving section causes the three-dimensional object to rotate by causing at least the first shaft to rotate, and the ink jet head includes a base coating head that performs printing of a base coat on the three-dimensional object and a drawing head that draws on the base coat, the base coating head and the drawing head are arranged so as to be adjoined in an array direction that intersects perpendicularly with an axial direction of the first shaft, and in a case of projecting to a plane parallel to the axial direction of the first shaft and the array direction, a center portion of the base coating head and the drawing head in the array direction overlaps with a center axis of the cylindrically shaped portion of the three-dimensional object. By configuring as above, for example, the same effect as that of Configuration 12 can be achieved.

(Configuration 14) A print method for performing printing on a three-dimensional object using an ink jet scheme is provided, the print method uses an ink jet head that discharges ink droplets and a print object retaining member that retains the three-dimensional object by making the three-dimensional object face the ink jet head, the print object retaining member includes a shaft-shaped first shaft extending in a direction that perpendicularly intersects with a direction along which the ink jet head discharges the ink droplets, a shaft-shaped second shaft extending in parallel with the first shaft, and a rotation driving section that causes at least the first shaft to rotate, in a case of performing printing on the three-dimensional object having a cylindrically shaped portion, the print object retaining member retains the three-dimensional object by mounting the cylindrically shaped portion on the first shaft and the second shaft, the ink jet head is provided at a position facing the side surface of the cylindrically shaped portion of the three-dimensional object mounted on the first shaft and the second shaft, and the rotation driving section causes the three-dimensional object to rotate by causing at least the first shaft to rotate, and the ink jet head includes a base coating head that performs printing of a base coat on the three-dimensional object and a drawing head that draws on the base coat, the base coating head and the drawing head are arranged so as to be adjoined in an array direction that intersects perpendicularly with an axial direction of the first shaft, and in a case of projecting to a plane parallel to the axial direction of the first shaft and the array direction, a center portion of the base coating head and the drawing head in the array direction overlaps with a center axis of the cylindrically shaped portion of the three-dimensional object. By configuring as above, for example, the same effect as that of Configuration 12 can be achieved.

Effects of the Invention

According to the present invention, for example, the printing on the three-dimensional object having the cylindrically shaped portion can be performed appropriately with high accuracy.

BRIEF DESCRIPTION OF THE DRAWINGS

FIG. 1A shows the example of function and configuration of a main part of the ink jet printer 10. FIG. 1B is a diagram showing a more specific example of the configuration of the entire ink jet printer 10.

FIG. 2A is a perspective view showing the print object retaining section 18 in a state of being assembled to a main body of the ink jet printer 10. FIG. 2B is a perspective view showing the configuration of the entire print object retaining section 18.

FIG. 3A is a cross sectional view showing an example of the positional relationship in a case of mounting the three-dimensional object 50 on a first shaft 102 and a second shaft 104. FIG. 3B is a cross sectional view showing an example of the positional relationship in a case of mounting the three-dimensional object 50 on the first shaft 102 and a third shaft 106. FIG. 3C is a perspective view showing the example of the positional relationship in a case of mounting the three-dimensional object 50 on a first shaft 102 and a second shaft 104 as in FIG. 3A.

FIG. 4A and FIG. 4B respectively show the print object retaining section 18 as seen from one end side and the other end side of the first shaft 102, the second shaft 104, and the third shaft 106.

FIG. 7A to FIG. 7D respectively show the side surface of the print object retaining section 18 as seen from directions of arrows A to D shown in FIG. 6.

EMBODIMENTS OF THE INVENTION

Figure 1A:
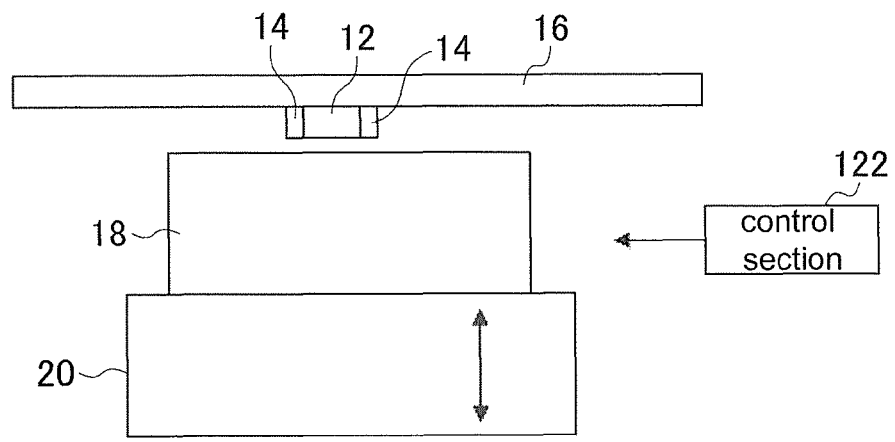
FIG. 1A and FIG. 1B are diagrams showing an example of a configuration of an ink jet printer 10 according to one embodiment of the present invention.
Figure 1B:
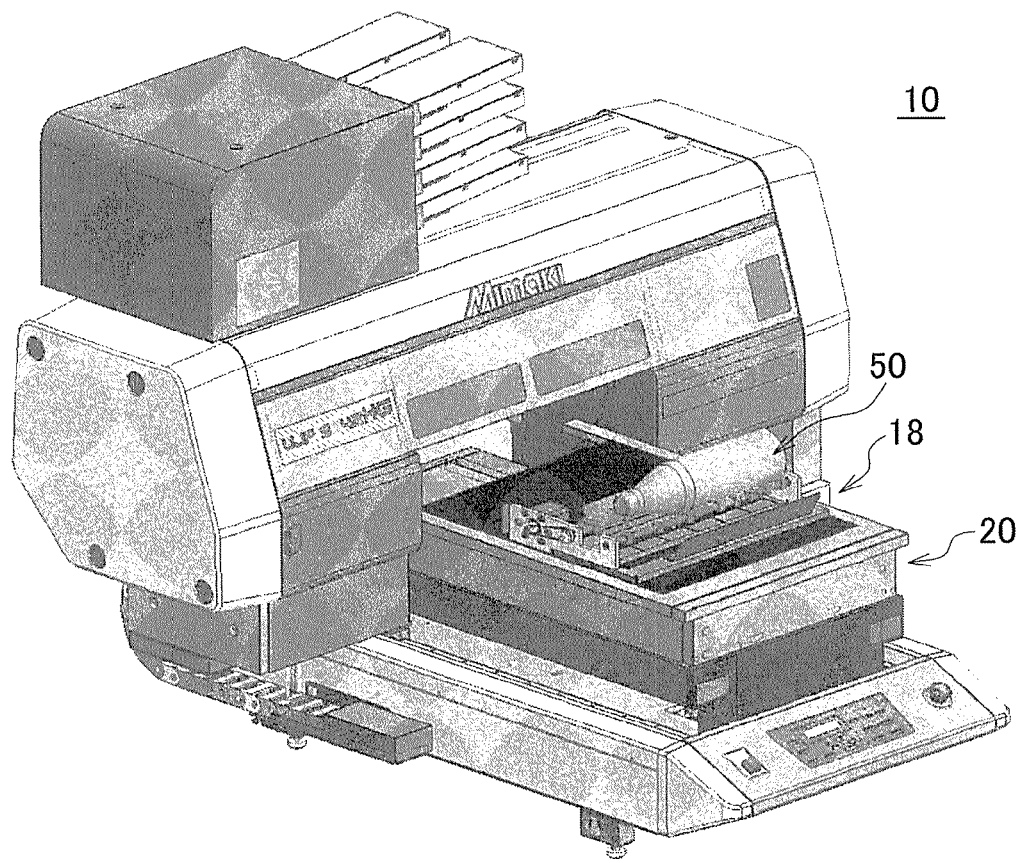

Hereinbelow, embodiments according to the present invention will be described with reference to the drawings. FIG. 1A and FIG. 1B show an example of a configuration of an ink jet printer 10 according to one embodiment of the present invention. FIG. 1A shows the example of function and configuration of a main part of the ink jet printer 10.

In this example, the ink jet printer 10 is a print device that performs printing on a three-dimensional object having a cylindrically shaped portion by using an ink jet scheme. The three-dimensional object having the cylindrically shaped portion is for example a bottle, a cylindrical container, and the like. Further, the ink jet printer 10 includes a head section 12, an ultraviolet irradiating section 14, a guide rail 16, a print object retaining section 18, a retaining section-driving section 20, and a control section 22.

The head section 12 is a portion including an ink jet head that discharges ink droplets onto a three-dimensional object being a printing target. The head section 12 is configured of a plurality of ink jet heads that discharges ink droplets of ultraviolet curing type ink, and as these ink jet heads, at least a base coating head and a drawing head are included. The base coating head is an ink jet head for performing printing of a base coat on the three-dimensional object. As the base coating head, for example, an ink jet head that forms an ink layer of a predetermined color such as white can be used. The base coating head may be ink jet heads for discharging the ink droplets of a plurality of colors. Further, the drawing head is an ink jet head for drawing on the base coat formed by the base coating head. The drawing head is an ink jet head for performing color printing for example by discharging the ink droplets of each of CMYK colors. Further, the head section 12 may further include an ink jet head for discharging clear ink and the like, for example. The ultraviolet irradiating section 14 is a light source for generating ultraviolet ray for curing the ink.

The guide rail 16 is a rail-shaped member extending in a predetermined main scanning direction, which causes the head section 12 to perform a main scan operation (scanning operation) upon printing. In the scanning operation, the head section 12 discharges the ink droplets while moving in the main scanning direction along the guide rail 16.

The print object retaining section 18 is a retaining member that retains the print object that is a three-dimensional object being the printing target by making it face the head section 12, and retains the three-dimensional object by making a cylindrically shaped portion of the three-dimensional object face the head section 12. A detailed configuration of the print object retaining section 18 will be described later in detail.

The retaining section-driving section 20 is a driving mechanism that moves the print object retaining section 18. In this example, the retaining section-driving section 20 for example moves the print object retaining section 18 in a direction along which the head section 12 discharges the ink droplets (discharging direction). Due to this, the retaining section-driving section 20 adjusts a gap distance between a position where an ink droplet strikes on the three-dimensional object (striking position) and the head section 12. The retaining section-driving section 20 for example moves the print object retaining section 18 upward and downward in a range of about 5 cm or so. Notably, the adjustment of the gap distance may be performed by moving the head section 12 side, for example. In this case, the retaining section-driving section 20 relatively moves the print object retaining section 18 with respect to the head section 12 by moving the guide rail 16, for example.

Further, in this example, the retaining section-driving section 20 can also move the print object retaining section 18 in the main scanning direction and a sub scanning direction. The sub scanning direction is a direction that intersects perpendicularly with the discharging direction of the ink droplets and the main scanning direction. Due to this, the retaining section-driving section 20 performs positioning of the three-dimensional object with respect to the ink jet head 12, for example.

The control section 22 is for example a CPU of the ink jet printer 10, and controls operations of respective sections of the ink jet printer 10 based on instructions received from an external host PC, and program such as a firmware and the like, for example. For example, the control section 22 performs positioning of the three-dimensional object being the printing target by controlling the operation of the retaining section-driving section 20. Further, by controlling the operation of the print object retaining section 18, the three-dimensional object retained by the print object retaining section 18 can be caused to rotate. Further, by controlling the operation of the head section 12, the head section 12 is caused to perform printing on the cylindrically shaped portion of the three-dimensional object.

FIG. 1B is a diagram showing an example of a more specific configuration of the entire ink jet printer 10, and shows a perspective view of the ink jet printer 10 in a state where the retaining section-driving section 20 and the print object retaining section 18 are brought out to an outside of a main body of the ink jet printer 10. In this example, as the main body of the ink jet printer 10, for example, UJF-3042HG type of print device manufactured by Mimaki Engineering Co., Ltd. can suitably be used. This print device is an ink jet printer that can print on a three-dimensional object 50 placed in a region of 30 cm×42 cm. Further, in this case, for example, functions of the head section 12, the ultraviolet irradiating section 14, the guide rail 16, the retaining section-driving section 20, and the control section 22 can be realized by functions of the main body of the print device. Further, the print object retaining section 18 can be installed with high accuracy by using a hole section for positioning and the like provided on a member corresponding to the retaining section-driving section 20. Moreover, printing can appropriately be performed at a high resolution, for example, 600 dpi or more (for example, 720×600 dpi, 1,440×1,200 dpi, etc.).

As above, according to the present example, printing onto the three-dimensional object having the cylindrically shaped portion can be performed appropriately with high accuracy. Subsequently, the detailed configuration of the print object retaining section 18 will be described further in detail.

Figure 2A:
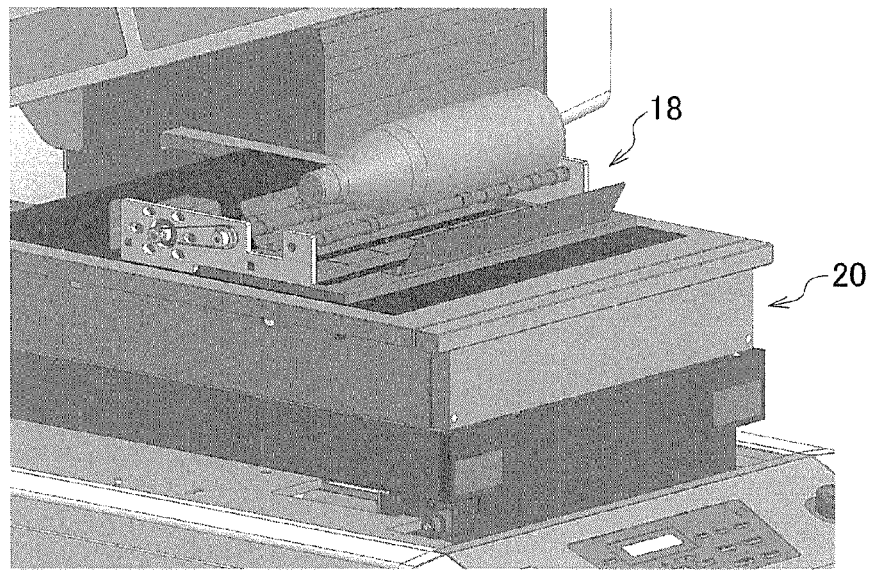
FIG. 2A and FIG. 2B are diagrams showing a first example of a detailed configuration of a print object retaining section 18.
Figure 2B:
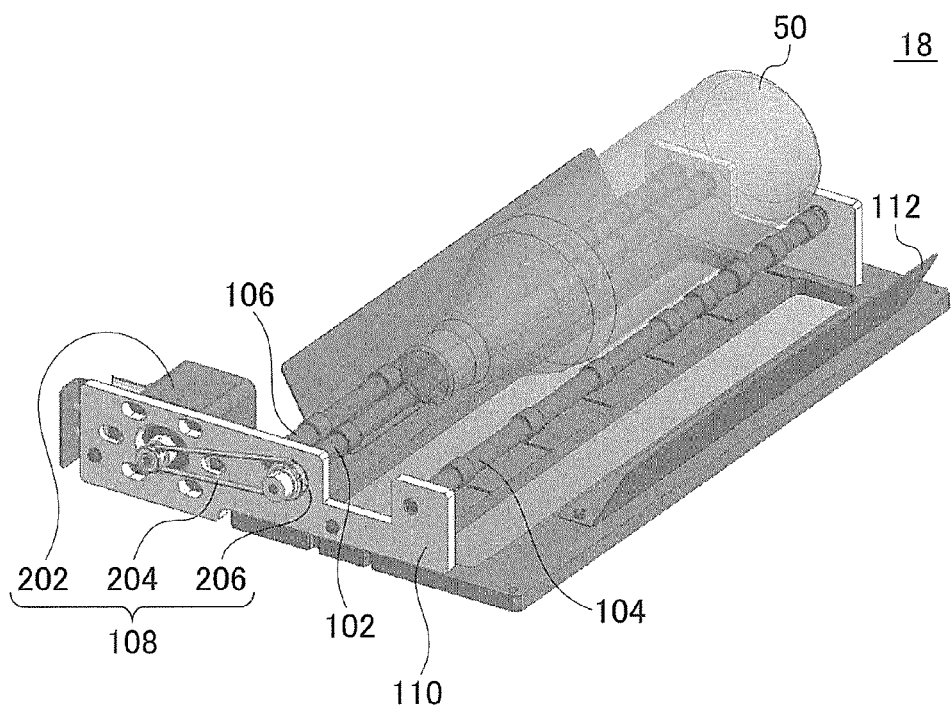

FIG. 2A and FIG. 2B show a first example of the detailed configuration of the print object retaining section 18. FIG. 2A is a perspective view that shows the print object retaining section 18 in a state of being assembled to the main body of the ink jet printer 10 (see FIG. 1A and FIG. 1B). FIG. 2B is a perspective view showing the configuration of the entire print object retaining section 18.

In this example, the print object retaining section 18 is a member that retains the three-dimensional object 50 having the cylindrically shaped portion, and includes a first shaft 102, a second shaft 104, a third shaft 106, a housing section 110, a cover member 112, and a rotation driving section 108. The first shaft 102, the second shaft 104, and the third shaft 106 are shaft-shaped members that extend in parallel with each other in the direction that intersects perpendicularly with the discharging direction of the ink droplets by the head section 12 (see FIG. 1A and FIG. 1B), and are retained rotatably in the print object retaining section 18.

More specifically, in this example, the first shaft 102, the second shaft 104, and the third shaft 106 extend in the main scanning direction in the state of being attached to the ink jet printer 10. Further, the third shaft 106 is provided on an opposite side from the second shaft 104 relative to the first shaft 102. Further, distances between the shafts are fixed, and the distance between the first shaft 102 and the second shaft 104 is larger than the distance between the first shaft 102 and the third shaft 106. Further, a plurality of rubber rings for preventing slippage is attached to side surfaces of the respective shafts.

The housing section 110 is a housing part of the print object retaining section 18. In this example, the housing section 110 includes at least side surfaces that support one end side and the other end side of each shaft, and retains each shaft rotatably. Further, the cover member 112 is a member for preventing the three-dimensional object 50 retained by the print object retaining section 18 from falling off.

The rotation driving section 108 is a driving section that causes the first shaft 102 to rotate. In this example, the rotation driving section 108 includes a stepping motor 202, a pulley 206, and a timing belt 204. The stepping motor 202 is a motor that rotates according to an instruction received from the control section 22 (see FIG. 1A and FIG. 1B). The stepping motor 202 may for example receive an instruction to rotate from an external host PC via the control section 22.

The pulley 206 is connected to one end of the first shaft 102, and causes the first shaft 102 to rotate in accordance with rotation of itself. Further, the timing belt 204 connects the pulley 206 and the stepping motor 202, and causes the pulley 206 to rotate in accordance with a rotation amount of the stepping motor 202. Due to this, the timing belt 204 causes the first shaft 102 to rotate in accordance with the rotation of the stepping motor 202.

According to these configurations, in this example, the first shaft 102 functions as a driving shaft (driving roller). Further, the second shaft 104 and the third shaft 106 function as driven shafts (driven rollers).

Subsequently, a method to perform printing will be described further in detail by using the print object retaining section 18 of this example. In this example, the three-dimensional object 50 being the printing target is retained by having its cylindrically shaped portion mounted either on the first shaft 102 and the second shaft 104, or on the first shaft 102 and the third shaft 106, depending on a diameter of the cylindrically shaped portion. For example, in FIG. 2A and FIG. 2B, a state where the three-dimensional object 50 is retained on the first shaft 102 and the second shaft 104 in the case where the diameter of the cylindrically shaped portion is large is shown. On the other hand, although not shown, in the case where the diameter of the cylindrically shaped portion is small, that is, more specifically in the case where the diameter of the cylindrically shaped portion is smaller than a gap between the first shaft 102 and the second shaft

104, for example, the three-dimensional object 50 is retained on the first shaft 102 and the third shaft 106.

Further, upon printing, a positional relationship of the ink jet head in the head section 12 and the three-dimensional object 50 is adjusted to a position where a side surface of the cylindrically shaped portion of the three-dimensional object 50 mounted on two shafts and the ink jet head are faced. Further, in this state, the first shaft 102 is rotated by the rotation driving section 108, and the three-dimensional object 50 is caused to rotate in accordance with rotation thereof. Further, the cylindrically shaped portion of the three-dimensional object 50 is mounted on the first shaft 102 and the second shaft 104, the second shaft 104 is rotated in accordance with rotation of the three-dimensional object 50. Further, in the case where the cylindrically shaped portion of the three-dimensional object 50 is mounted on the first shaft 102 and the third shaft 106, the third shaft 106 is rotated in accordance with rotation of the three-dimensional object 50.

Here, in this example, the operation to cause the three-dimensional object 50 rotate by the rotation driving section 108 is an operation to feed a region to be the printing target within the side surface of the cylindrically shaped portion relative to the head section 12. Due to this, the rotation driving section 108 performs this rotation operation in between scanning operations by the head section 12. Due to this, each region within the cylindrically shaped portion can sequentially be sent in the sub scanning direction between the scanning operations.

Thus, according to the present example, the three-dimensional object 50 having the cylindrically shaped portion can appropriately be retained by causing the cylindrically shaped portion face the ink jet head. Further, the three-dimensional object 50 is rotated by causing the first shaft 102 to rotate by the rotation driving section 108, and the region facing the ink jet head within the three-dimensional object 50 can be changed successively. Further, due to this, for example, printing can be performed appropriately to an entirety of the cylindrically shaped portion of the three-dimensional object.

Further, in this example, as the position to mount the three-dimensional object 50, either on the first shaft 102 and the second shaft 104 or on the first shaft 102 and the third shaft 106 can be selected depending on the diameter of the three-dimensional object 50. Due to this, according to the present example, printing can be performed appropriately for the three-dimensional objects 50 with various diameters.

Further, in this example, the second shaft 104 and the third shaft 106 function as the driven shafts. Due to this, the rotation driving section 108 simply needs to drive the first shaft 102 only. Further, synchronizing control and the like of rotation amounts of a plurality of shafts does not need to be performed, either. Due to this, according to the present example, printing can be performed appropriately for the three-dimensional objects 50 with various diameters for example by a configuration with lower cost.

Notably, in order to perform printing on the three-dimensional objects 50 with various diameters, for example, it may be considered to retain the three-dimensional objects 50 by independent configurations suitable for their respective diameters. However, in this case, for example, a plurality of types of print object retaining sections with different distances between shafts needs to be prepared. Further, as a result, the device cost significantly increases.

Further, in order to perform printing on the three-dimensional objects 50 with various diameters, using only two shafts and making a distance between the shafts variable may be considered. However, in this case, an influence may be imposed on accuracy of printing by an error and the like upon setting the shaft position. Further, if the shaft movement is attempted with high accuracy, the configuration becomes complicated, and the cost might be increased.

Further, in the case of making the distance between the shafts variable, normally it is assumed to have the driving shaft side fixed and only the driven shaft side is moved. However, in this case, accompanying the movement of the driven shaft, a position of a center axis of the three-dimensional object 50 changes accordingly. Due to this, the burden of the work to align the position of the three-dimensional object 50 relative to the head section 12 might increase. Further, in the case of configuring to move the driving shaft side as well, the configuration becomes complicated, and the cost might increase.

To the contrary, in this example, the three-dimensional object 50 can be retained appropriately with even higher accuracy by using the first shaft 102, the second shaft 104, and the third shaft 106 provided at the predetermined positions fixed as above without using any complicated configuration. Further, with a configuration with lower cost, printing can be performed appropriately on the three-dimensional objects 50 with various diameters.

Further, in this case, since the distance (inter-axis distance) between shafts on which the three-dimensional object is mounted becomes known, for example, if the height of the three-dimensional object 50 relative to the shafts is given, the diameter of the cylindrically shaped portion of the three-dimensional object 50 can be obtained accurately. Further, due to this, since the printing region in the cylindrically shaped portion of the three-dimensional object 50 can be grasped accurately, for example, end positions of the printing can be controlled accurately.

Further, in this example, the control of the rotation amount of the first shaft 102 can be performed appropriately with high accuracy by using the stepping motor 202 and the timing belt 204 and the like in the rotation driving section 108. Due to this, according to the present example, the printing on the three-dimensional object 50 having the cylindrically shaped portion can be performed appropriately with even higher accuracy.

Notably, in order to cause the three-dimensional object 50 to rotate, for example, a typical motor and belt and the like may be considered to be used instead of using the stepping motor 202 and the timing belt 204 as in the present example. However, in this case, slippage may occur in the belt during driving, and a possibility of an error generation in the rotation amount becomes higher. Especially, as in the present example, in the case of performing the operation to sequentially feed each region of the cylindrically shaped portion in the sub scanning direction by the rotation of the three-dimensional object 50, the generated error may directly influence the accuracy of printing. Due to this, in the configuration of the present example, it can be said that the use of the stepping motor 202 and the timing belt 204 is especially preferable.

Further, in the ink jet printer 10 of the present example, the print object retaining section 18 moves according to the operation of the retaining section-driving section 20 (see FIG. 1A and FIG. 1B). Further, due to this, an adjustment of the gap distance is performed for the three-dimensional object 50 retained by the print object retaining section 18. For example, the retaining section-driving section 20 adjusts the gap distance to be in the range of 1.0 to 1.5 mm by relatively moving the print object retaining section 18 with respect to the head section 12.

By configuring as above, for example, an appropriate gap distance with respect to the three-dimensional objects 50 with various diameters can be maintained. Due to this, according to the present example, printing can be appropriately performed on the three-dimensional objects 50 with various diameters with high accuracy.

Further, in this case, by clearly dividing the function to perform the up and down movement in the discharging direction of the ink droplets and the function to cause the three-dimensional object 50 to rotate, the control of each of them can more appropriately and easily be performed. Due to this, according to the present example, the printing on the three-dimensional object 50 having the cylindrically shaped portion can be performed appropriately with even higher accuracy.

Notably, in this example, the gap distance is a distance between an opening of a nozzle from which the ink jet head in the head section 12 discharges the ink droplets and the striking position, for example. In a case where the gap distance is large, the ink droplets are easily turned into mist, so there are cases where the printing becomes difficult to be appropriately performed with high accuracy. Further, in a case where the gap distance is too small, vibration upon the printing operation and an influence of surface patterns on a print surface may cause the ink jet head and the three-dimensional object to collide.

Figure 3A:
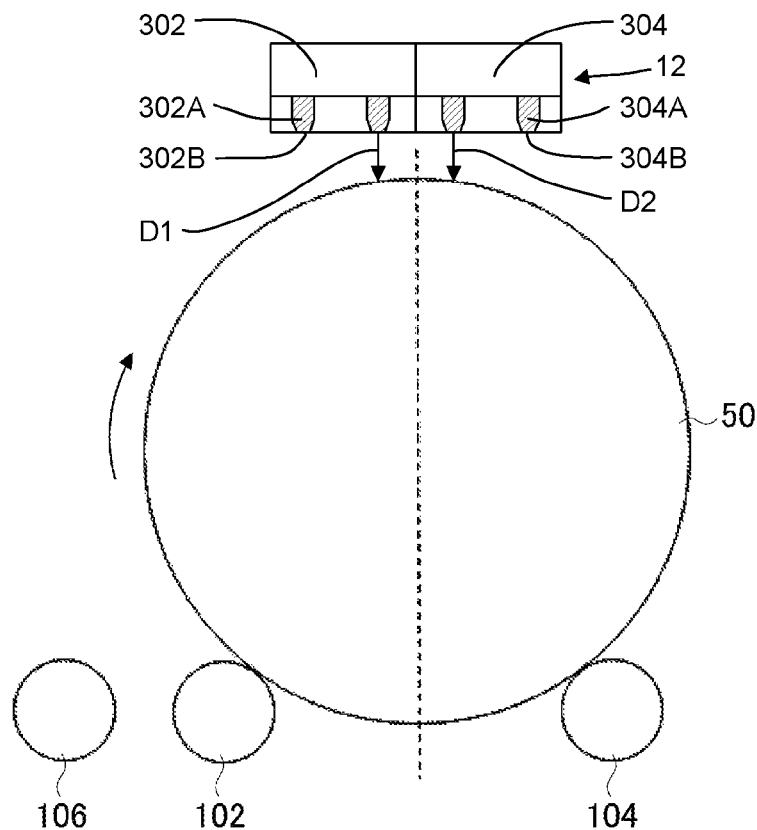
FIG. 3A to FIG.3C are diagrams showing an example of a positional relationship of a head section 12 and a three-dimensional object 50 upon printing.
Figure 3B:
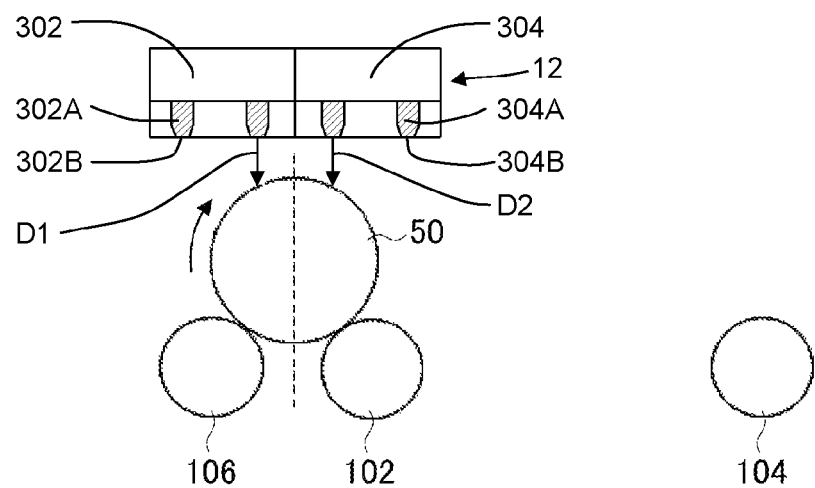

Subsequently, the positional relationship between the three-dimensional object 50 and the ink jet head will be described further in detail. FIG. 3A and FIG. 3B show an example of the positional relationship between the head section 12 and the three-dimensional object 50 upon printing. FIG. 3A is a cross sectional view showing one example of the positional relationship in the case of mounting the three-dimensional object 50 on the first shaft 102 and the second shaft 104, and shows one example of a cross sectional configuration of a plan surface vertical to the axial direction of the three-dimensional object 50. FIG. 3B is a cross sectional view showing one example of the positional relationship in the case of mounting the three-dimensional object 50 on the first shaft 102 and the third shaft 106, and shows one example of a cross sectional configuration of the plan surface similar to FIG. 3A.

As described in relation to FIG. 1A and FIG. 1B, in this example, the head section 12 includes a base coating head 302 and a drawing head 304. Further, the base coating head 302 and the drawing head 304 are arranged to be adjoined in an array direction that intersects perpendicularly with the axial direction of the first shaft 102. Further, in this example, the three-dimensional object 50 is positioned to the mounting position by moving the entirety of the print object retaining section 18 by the retaining section-driving section 20, and a relative position of the three-dimensional object 50 relative to the base coating head 302 and the drawing head 304 is adjusted.

Further, more specifically, by this adjustment, for example, a center portion of the base coating head 302 and the drawing head 304 in the array direction is arranged just above a topmost portion of the cylindrically shaped portion of the three-dimensional object 50. The topmost portion of the cylindrically shaped portion of the three-dimensional object 50 is a position corresponding to a point closer to the head section 12 side among intersecting points of a straight line shown by a broken line in the figure, and the side surface of the three-dimensional object 50. Further, the straight line shown by the broken line is a straight line that is parallel to the discharging direction of the ink droplets by the base coating head 302 and the drawing head 304, and passes through the center axis of the three-dimensional object 50.

Figure 3C:
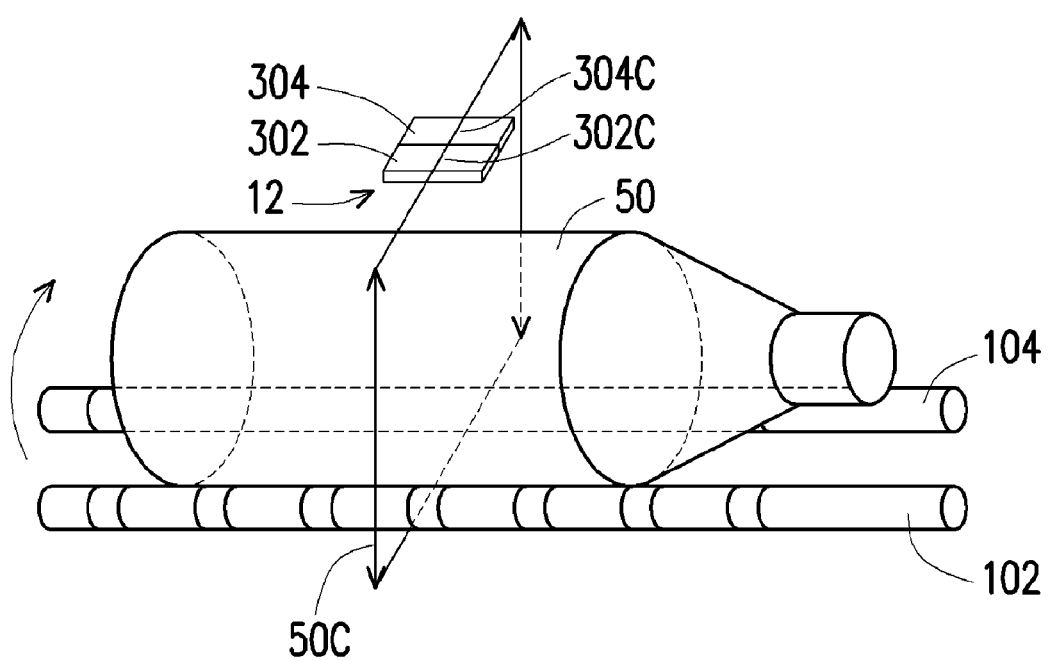

In the cross sectional view as shown, the topmost portion of the cylindrically shaped portion of the three-dimensional object 50 can be said to be a portion that becomes closest to the nozzle surfaces of the base coating head 302 and the drawing head 304, for example. Further, according to this configuration, referring to FIG. 3C in a case of seeing from a further upper side of the head section 12 (farther side from the three-dimensional object 50) instead of the cross sectional view as shown, the center portion 302C of the base coating head 302 and the center portion 304C of the drawing head 304 in the array direction overlaps with the center axis 50C of the cylindrically shaped portion of the three-dimensional object 50. The case of seeing from the further upper side of the head section 12 is a case of projecting each configuration to a plane that is parallel to the axial direction and the array direction of the first shaft 102, for example.

In configuring as above, a gap distance D1 in the base coating head 302 and a gap distance D2 in the drawing head 304 become equal (see FIG. 3A and FIG. 3B). Similar to the description above, the gap distance D1 is a distance between an opening 302B of a nozzle 302A of the base coating head 302 from which the ink jet head in the head section 12 discharges the ink droplets and the striking position, and the gap distance D2 is a distance between an opening 304B of a nozzle 304A of the drawing head 304 from which the ink jet head in the head section 12 discharges the ink droplets and the striking position. Due to this, according to the present example, printings by the base coating head 302 and the drawing head 304 can both be performed appropriately with high accuracy. Further, due to this, printing on the three-dimensional object 50 having the cylindrically shaped portion can be performed appropriately with even higher accuracy.

Notably, the gap distances in the base coating head 302 and the drawing head 304 are distances as designed, for example. The designed distances being equal may for example be a state where the base coating head and the drawing head are provided with the intension to make them be at the same distance.

Further, the gap distances of the base coating head 302 and the drawing head 304 are preferably in the range of 1.0 to 1.5 mm. By configuring as above, the printing by each head can be performed appropriately with high accuracy.

Here, in printing on the three-dimensional object 50, the printing by the drawing head 304 can be thought to require printing with higher accuracy than the printing of the base coat by the base coating head 302. Due to this, as to the relative position of the three-dimensional object 50 with respect to the base coating head 302 and the drawing head 304, it may seem preferable to have the position of the drawing head 304 meet with the topmost portion of the three-dimensional object 50.

However, as in the present example, in the case of performing the printing on the three-dimensional object 50 having the cylindrically shaped portion, if the gap distance is optimized only for the drawing head 304, a difference is generated between the gap distances of the base coating head 302 and the drawing head 304, and printing control might become difficult.

Further, the formation of the base coat by the base coating head 302 in some cases is performed only to a partial region instead of the entirety of the cylindrically shaped portion of the three-dimensional object 50. In this case, if the gap distance of the base coating head 302 is too large, a boundary portion of the portion where the base coat is formed (edge portion) may become obscure, and the printing quality may be decreased. Due to this, in the base coating head 302 also, it is important to make the gap distance sufficiently small.

Accordingly, in the case of performing printing on the three-dimensional object 50 having the cylindrically shaped portion using the base coating head 302 and the drawing head 304, it can be said that it is important to appropriately performs printing by each head with high accuracy, for both of the heads. With respect to this, according to the present example, printing with each head can be performed appropriately with high accuracy. Further, due to this, printing onto the three-dimensional object 50 having the cylindrically shaped region can be performed more appropriately with high accuracy.

Notably, the arrangement of the ink jet head as above is not limited to the case of the base coating head 302 and the drawing head 304, and it is similarly preferable for a case of using a plurality of ink jet heads. Due to this, more generally, in the case of using the plurality of ink jet heads arranged in the array direction (for example, first ink jet head and second ink jet head), it is assumed preferable to set a center position of them similarly to the center position of the base coating head 302 and the drawing head 304 as mentioned above.

Figure 4A:
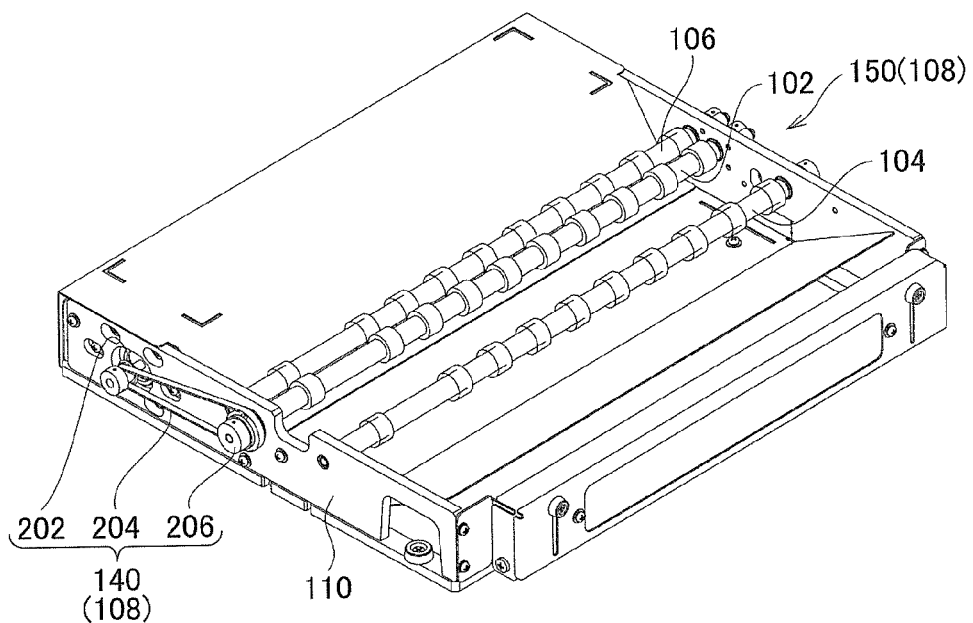
FIG. 4A and FIG. 4B are perspective views showing a second example of the detailed configuration of the print object retaining section 18.
Figure 4B:
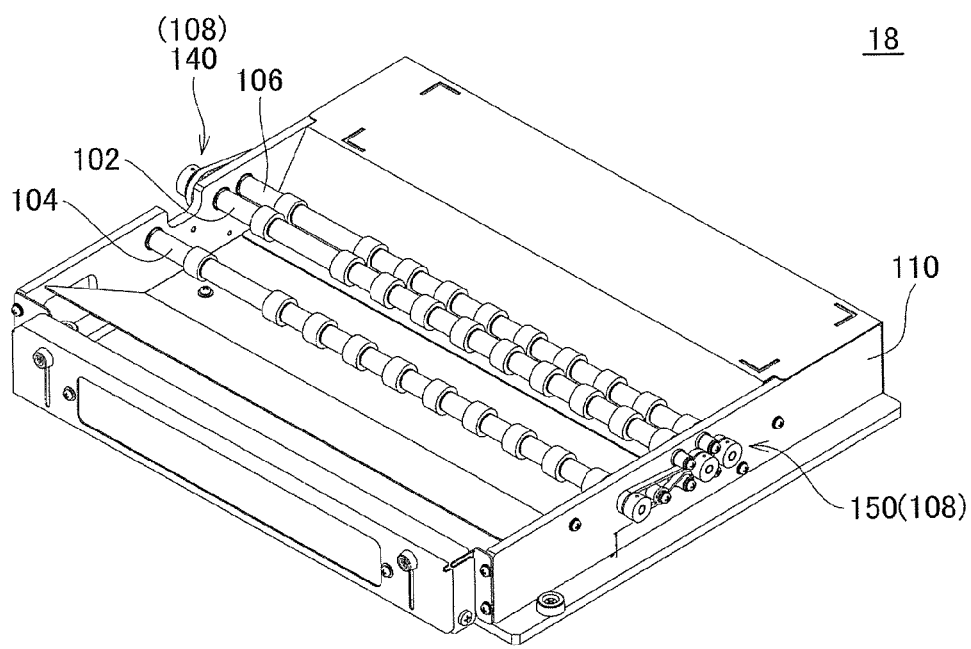
Figure 5:
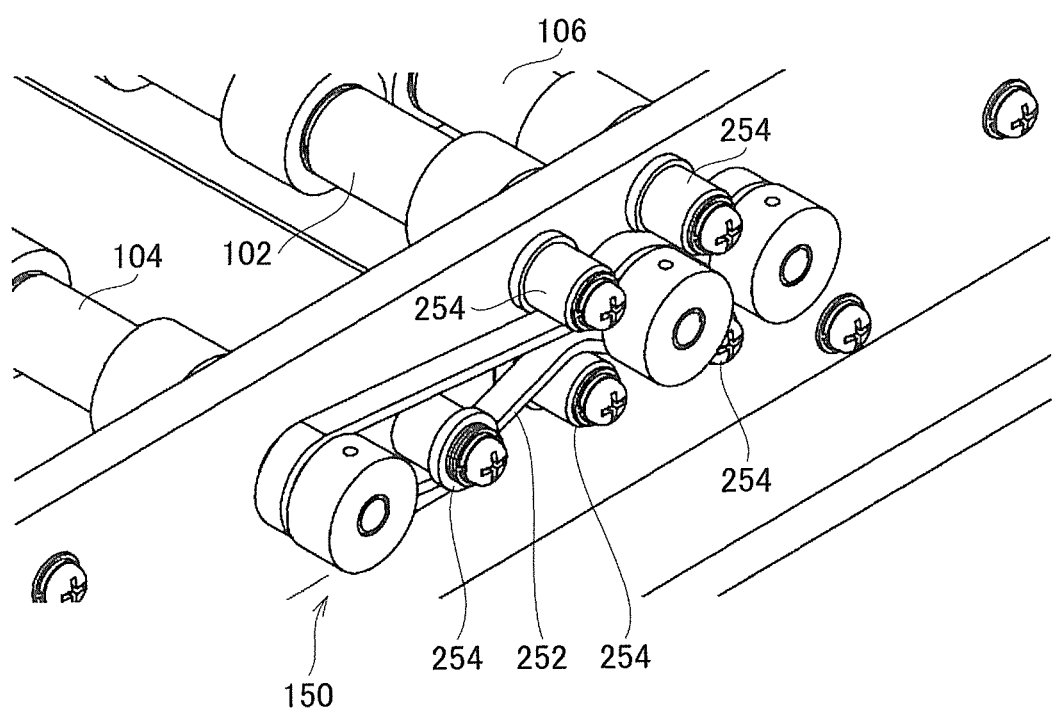
FIG. 5 is an enlarged view of a characteristic portion of the print object retaining section 18.
Figure 6:
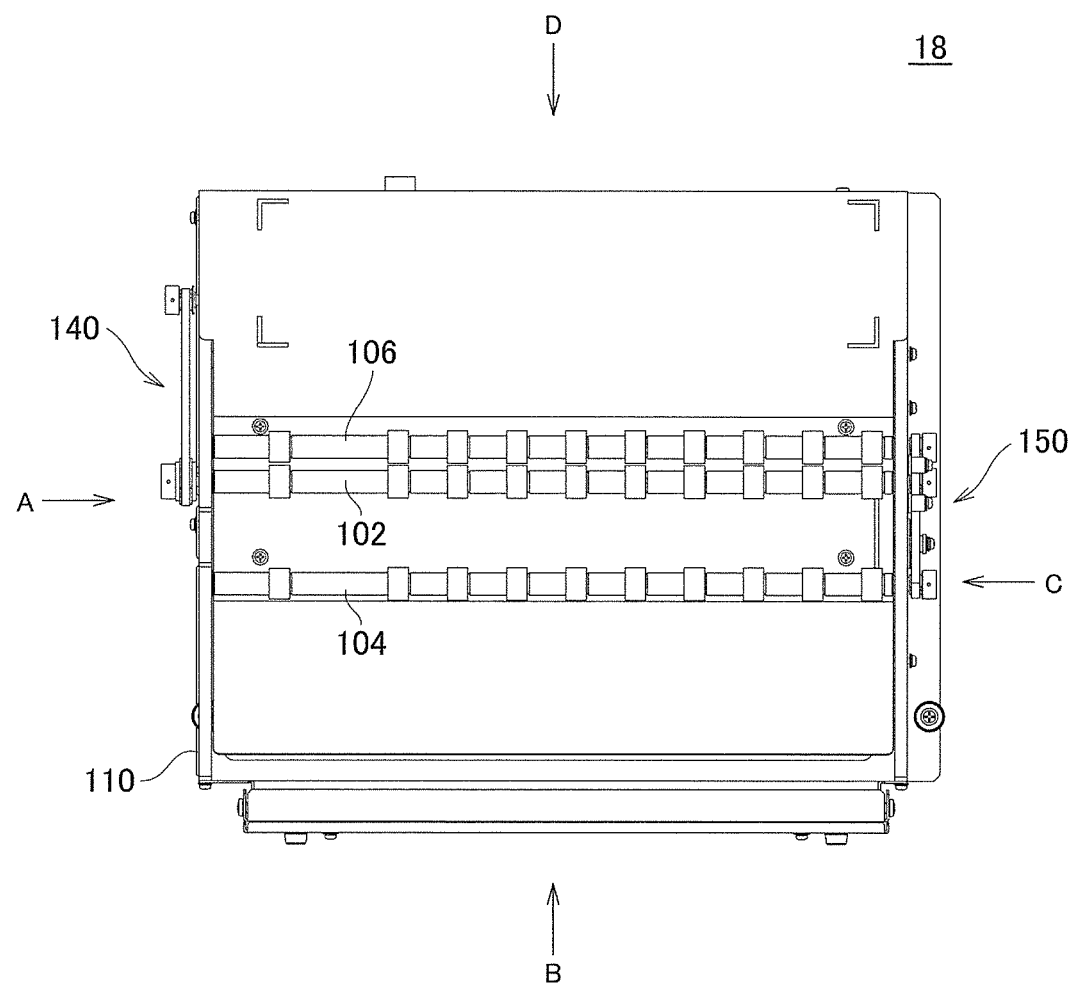
FIG. 6 is a top view of the print object retaining section 18.
Figure 7A:
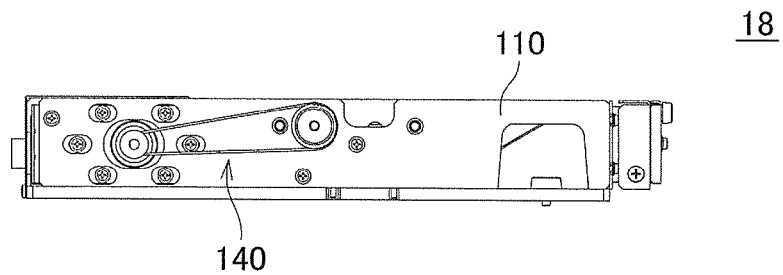
FIG. 7A to FIG. 7D are side elevational views of the print object retaining section 18.
Figure 7B:
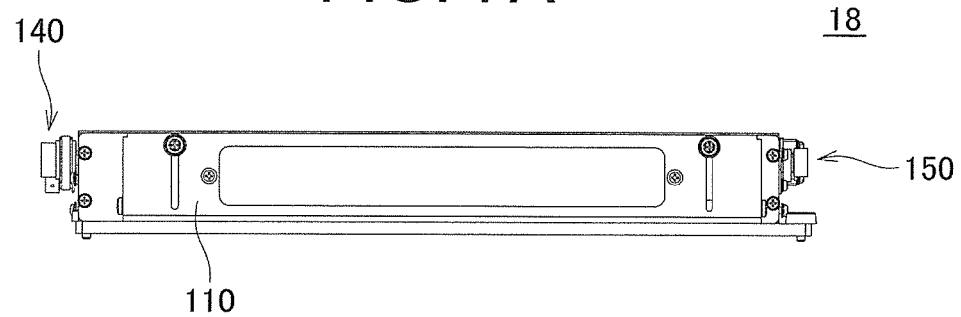
Figure 7C:
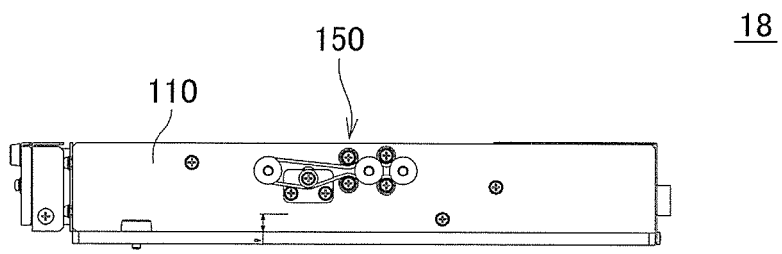
Figure 7D:
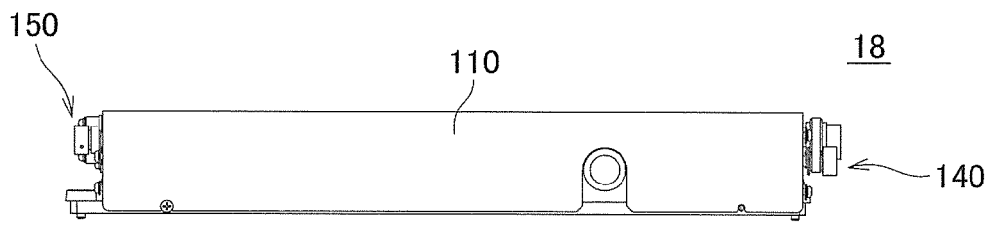

FIG. 4A, FIG. 4B, FIG. 5, FIG. 6, and FIG. 7A and FIG. 7D show a second example of a detailed configuration of the print object retaining section 18. FIG. 4A and FIG. 4B are perspective views of the print object retaining section 18. FIG. 4A and FIG. 4B respectively show the print object retaining section 18 as seen from one end side and the other end side of the first shaft 102, the second shaft 104, and the third shaft 106. FIG. 5 is an enlarged view of a characteristic portion of the print object retaining section 18 of the present example. FIG. 6 is a top view of the print object retaining section 18. FIG. 7A to FIG. 7D are side elevational views of the print object retaining section 18. FIG. 7A to FIG. 7D respectively show the side surfaces of the print object retaining section 18 as seen from directions of arrows A to D shown in FIG. 6. Notably, except for the points described below, configurations given the same reference signs as FIG. 1A, FIG. 1B, FIG. 2A, FIG. 2B, FIG. 3A, and FIG. 3B in FIG. 4A, FIG. 4B, FIG. 5, FIG. 6, and FIG. 7A to FIG. 7D have the same or similar characteristics as the configurations in FIG. 1A, FIG. 1B, FIG. 2A, FIG. 2B, FIG. 3A, and FIG. 3B.

In this example, as shown in FIG. 4A and FIG. 4B and the like, the rotation driving section 108 is configured of a first shaft driving section 140 and a cooperative driving section 150. Among them, the first shaft driving section 140 is a portion that is identical or similar to the rotation driving section 108 in the configuration described by using FIG. 1A, FIG. 1B, FIG. 2A, FIG. 2B, FIG. 3A, and FIG. 3B. The first shaft driving section 140 includes a stepping motor 202, a timing belt 204, and a pulley 206, and causes the first shaft 102 to rotate in accordance with rotation of the stepping motor 202 by transmitting motive power of the stepping motor 202 to one end side of the first shaft 102 by the timing belt 204.

Notably, in this example, the timing belt 204 is an example of a first belt that causes the first shaft 102 to rotate in accordance with rotation of the stepping motor 202. Further, the first shaft driving section 140 is provided on the one end side of the first shaft 102, the second shaft 104, and the third shaft 106.

The cooperative driving section 150 is a configuration for causing the second shaft 104 and the third shaft 106 in cooperation with the rotation of the first shaft 102. By using the cooperative driving section 150, the rotation driving section 108 of the present example causes the first shaft 102, the second shaft 104, and the third shaft 106 to rotate.

Further, as a more specific configuration, in this example, as shown in FIG. 5 and the like, the cooperative driving section 150 includes a cooperation belt 252, and a plurality of idlers 254. As the cooperation belt 252, for example, a timing belt can preferably be used. Notably, the cooperation belt 252 is one example of a second belt that causes the third shaft 106 to rotate in accordance with rotation of the first shaft 102. Further, in this example, the cooperation belt 252 further causes the second shaft 104 to rotate in accordance with rotation of the first shaft 102.

Further, in this example, the cooperation belt 252 is a ring-shaped belt, and is set in a state of having the first shaft 102, the second shaft 104, and the third shaft 106 installed inside of the ring-shaped belt. Due to this, the cooperation belt 252 connects the other end side of the first shaft 102 and the other end sides of the second shaft 104 and the third shaft 106. Further, the second shaft 104 and the third shaft 106 are caused to rotate in accordance with rotation of the first shaft 102. The cooperation belt 252 may connect the other end side of the first shaft 102 and the other end sides of the second shaft 104 and the third shaft 106 by connecting a pulley attached to the other end side of the first shaft 102 and pulleys attached to the other end side of the second shaft 104 and the third shaft 106, for example.

By configuring as above, for example, the first shaft 102, the second shaft 104, and the third shaft 106 can be rotated appropriately by the rotation driving section 108. Further, due to this, in this example, the first shaft 102, the second shaft 104, and the third shaft 106 all function as the driving shafts (driving rollers).

A plurality of idlers 254 are idling pulleys defining a position to pass the cooperation belt 252, and tension is applied to the cooperation belt 252 by making contact with the cooperation belt 252 at predetermined positions. By configuring as above, for example, the second shaft 104 and the third shaft 106 can more surely be cooperated with the first shaft 102.

As above, according to the present example, for example, by making not only the first shaft 102 but also the second shaft 104 and the third shaft 106 driving shafts, the three-dimensional object can appropriately be caused to rotate even in the case where the three-dimensional object being the printing target is light weighted. Further, especially, in the case of performing printing by mounting the compact three-dimensional object between the first shaft 102 and the third shaft 106 having a narrow width, the printing can be performed more appropriately. The three-dimensional object being the printing target may for example be a three-dimensional object in which a diameter of the cylindrically shaped portion is about 1 to 4 cm. More specifically, for example, it may be a signature stamp, or a beverage can (especially, empty can).

Figure 8:
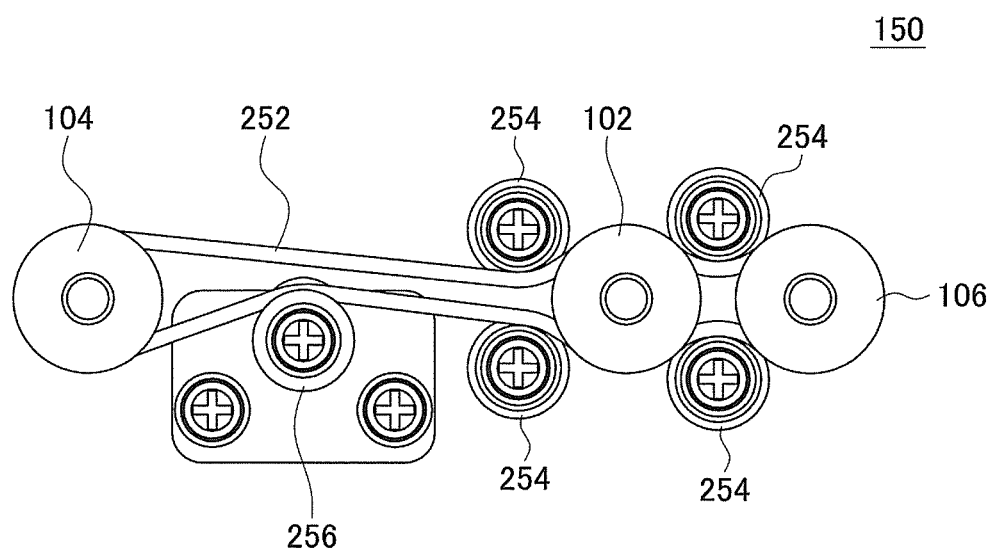
FIG. 8 is a diagram showing a variant of a cooperative driving section 150

FIG. 8 shows a modified example of the configuration of the cooperative driving section 150. Notably, except for the points described below, configurations given the same reference signs as FIG. 4A, FIG. 4B, FIG. 5, FIG. 6, and FIG. 7A to FIG. 7D in FIG. 8 have the same or similar characteristics as the configurations in FIG. 4A, FIG. 4B, FIG. 5, FIG. 6, and FIG. 7A to FIG. 7D.

The cooperative driving section 150 of the present example includes, as a part of an idling pulley defining the position for passing the cooperation belt 252, a position variable idler 256 that is an idling pulley capable of changing a position making contact with the cooperation belt 252. Further, the position variable idler 256 is one example of a tension adjusting member, and adjusts the tension of the cooperation belt 252 by changing the position making contact with the cooperation belt 252. Further, in this example, the cooperation belt 252 makes contact with the cooperation belt 252 between the first shaft 102 and the second shaft 104.

In configuring as above, for example, the tension of the cooperation belt 252 can more appropriately be adjusted by using the position variable idler 256. Further, the space between the shafts can be used efficiently by providing the position variable idler 256 between the first shaft 102 and the second shaft 104 with the wider gap compared to between the first shaft 102 and the third shaft 106. Due to this, by configuring as above, for example, the first shaft 102, the second shaft 104 and the third shaft 106 can more appropriately be made to cooperate.

Subsequently, yet another modified example of the cooperative driving section 150 will be described. The problem caused by insufficient weight of the three-dimensional object of the printing target is especially likely to occur in a case of mounting a three-dimensional object with a small diameter on the first shaft 102 and the third shaft 106 with a narrow gap. Due to this, in the yet another modified example of the cooperative driving section 150, for example, only the third shaft 106 between the second shaft 104 and the third shaft 106 may be made to cooperate with the first shaft 102.

However, in this case, the cooperation belt 252 will be too short by merely passing the cooperation belt 252 between the first shaft 102 and the third shaft 106, and the tension adjustment might become difficult. Due to this, in this case, for example, a pulley and the like for passing the cooperation belt 252 may newly be provided. In this case, a position to provide the new pulley is preferably a position for example where a distance from the first shaft 102 or the third shaft 106 becomes larger than the gap between the first shaft 102 and the third shaft 106. Further, in this case, it is preferable to further provide a tension adjusting member such as a position variable idler 256 and the like between the pulley and the first shaft 102 or the third shaft 106.

By configuring as above, for example, the third shaft 106 can be made to cooperate with the first shaft 102 more appropriately. Further, due to this, printing can be performed more appropriately for the three-dimensional object having the small diameter and light weight.

Further, as for the configuration of the print object retaining section 18, for example, it may be considered to be configured by using only two shafts for example, instead of using three shafts, namely the first shaft 102, the second shaft 104, and the third shaft 106. In this case, it may be considered to use a configuration that omits the second shaft 104 from the configuration that causes only the third shaft 106 to cooperate with the first shaft 102 as described above. In this case as well, for example, printing can be performed more appropriately for the three-dimensional object having the small diameter and light weight.

As above, the present invention has been described by using embodiments, however, the technical scope of the present invention is not limited to the scope described in the above embodiments. It is apparent to a person skilled in the art that various modifications and improvements can be made to the above embodiments. It is apparent from the description of the claims that such modifications and improvements are within the technical scope of the present invention.

INDUSTRIAL APPLICABILITY

The present invention can suitably be used in an ink jet printer, for example.

DESCRIPTION OF REFERENCE SIGNS

10 . . . ink jet printer, 12 . . . head section, 14 . . . ultraviolet irradiating section, 16 . . . guide rail, 18 . . . print object retaining section, 20 . . . retaining section-driving section, 22 . . . control section, 50 . . . three-dimensional object, 102 . . . first shaft, 104 . . . second shaft, 106 . . . third shaft, 108 . . . rotation driving section, 110 . . . housing section, 112 . . . cover member, 140 . . . first shaft driving section, 150 . . . cooperative driving section, 202 . . . stepping motor, 204 . . . timing belt, 206 . . . pulley, 252 . . . cooperation belt, 254 . . . idler, 256 . . . position variable idler, 302 . . . base coating head, 304 . . . drawing head

The invention claimed is:

1. An ink jet printer configured to perform printing on a three-dimensional object using an ink jet scheme, the ink jet printer comprising:
   an ink jet head that discharges ink droplets; and
   a print object retaining section that retains the three-dimensional object by making the three-dimensional object face the ink jet head;
   wherein the print object retaining section includes:
   a first shaft which is shaped like a shaft extending in a direction that perpendicularly intersects with a direction along which the ink jet head discharges the ink droplets;
   a second shaft which is shaped like a shaft extending in parallel with the first shaft;
   a third shaft which is shaped like a shaft that extends in parallel with the first shaft on an opposite side from the second shaft relative to the first shaft, wherein a distance between the first shaft and the second shaft is larger than a distance between the first shaft and the third shaft, and
   a rotation driving section that causes at least the first shaft to rotate,
   wherein in a case of performing printing on the three-dimensional object having a cylindrically shaped portion, the print object retaining section retains the three-dimensional object by mounting the cylindrically shaped portion either on the first shaft and the second shaft, or on the first shaft and the third shaft, such that when the cylindrically shaped portion is mounted on the first shaft and the second shaft, a side surface of the cylindrically shaped portion is in contact with a side surface of the first shaft and a side surface of the second shaft,
   the ink jet head is provided at a position facing another side surface of the cylindrically shaped portion of the three-dimensional object mounted on the first shaft and the second shaft, or on the first shaft and the third shaft,
   the rotation driving section causes the cylindrically shaped portion of the three-dimensional object to rotate by causing at least the first shaft to rotate,
   the ink jet head includes:
   a base coating head that performs printing of a base coat on the three-dimensional object; and
   a drawing head that draws on the base coat,
   the base coating head and the drawing head are arranged so as to be adjoined in a rotation direction in which the cylindrically shaped portion rotates and that intersects perpendicularly with an axial direction of the first shaft, and in a case of projecting to a plane parallel to the axial direction of the first shaft and the rotation direction, a center portion of the base coating head and the drawing head in the rotation direction overlaps with a center axis of the cylindrically shaped portion of the three-dimensional object, such that in view of a gap distance that is a distance between an opening of a nozzle from which the ink jet head discharges the ink droplets and a striking position, the gap distance in the base coating head and the gap distance in the drawing head become substantially equal.

2. The ink jet printer according to claim 1, wherein the rotation driving section rotates only the first shaft among the first shaft, the second shaft, and the third shaft, in the case where the cylindrically shaped portion of the three-dimensional object is mounted on the first shaft and the second shaft, the second shaft rotates in accordance with rotation of the three-dimensional object, and in the case where the cylindrically shaped portion of the three-dimensional object is mounted on the first shaft and the third shaft, the third shaft rotates in accordance with the rotation of the three-dimensional object.

3. The ink jet printer according to claim 1, wherein the rotation driving section includes:

a stepping motor; and a timing belt that causes the first shaft to rotate in accordance with rotation of the stepping motor.

4. The ink jet printer according to claim 1, further comprising: a retaining section-driving section that moves the print object retaining section relative to the ink jet head in the direction along which the ink jet head discharges the ink droplets, wherein the retaining section-driving section moves the print object retaining section relative to the ink jet head so that a distance between the ink jet head and a position where an ink droplet strikes on the three-dimensional object upon printing onto the first print surface is in a range of 1.0 to 1.5 mm.

5. The ink jet printer according to claim 1, wherein the rotation driving section causes at least the first shaft and the third shaft to rotate.

6. The ink jet printer according to claim 5, wherein the rotation driving section includes:

a stepping motor;

a first belt that causes the first shaft to rotate in accordance with rotation of the stepping motor; and a second belt that causes the third shaft to rotate in accordance with rotation of the first shaft.

7. The ink jet printer according to claim 6, wherein the second belt is a ring-shaped belt, and causes the second shaft and the third shaft to rotate in accordance with rotation of the first shaft by being provided in a state of having the first shaft, the second shaft, and the third shaft installed inside the ring-shaped belt, the rotation driving section further includes a tension adjusting member that adjusts tension of the second belt by changing a position to make contact with the second belt, and the tension adjusting member makes contact with the second belt between the first shaft and the second shaft.

8. The ink jet printer according to claim 1, wherein the rotation driving section includes:

a stepping motor; and a timing belt that causes the first shaft to rotate in accordance with rotation of the stepping motor.

9. The ink jet printer according to claim 1, further comprising: a retaining section-driving section that moves the print object retaining section relative to the ink jet head in the direction along which the ink jet head discharges the ink droplets, wherein the retaining section-driving section moves the print object retaining section relative to the ink jet head so that a distance between the ink jet head and a position where an ink droplet strikes on the three-dimensional object upon printing onto the first print surface is in a range of 1.0 to 1.5 mm.

10. A print method for performing printing on a three-dimensional object using an ink jet scheme, the method using:

an ink jet head that discharges ink droplets; and a print object retaining member that retains the three-dimensional object by making the three-dimensional object face the ink jet head;

wherein the print object retaining member includes:

a first shaft which is shaped like a shaft extending in a direction that perpendicularly intersects with a direction along which the ink jet head discharges the ink droplets;

a second shaft which is shaped like a shaft extending in parallel with the first shaft;

a third shaft which is shaped like a shaft that extends in parallel with the first shaft on an opposite side from the second shaft relative to the first shaft, wherein a distance between the first shaft and the second shaft is larger than a distance between the first shaft and the third shaft, and a rotation driving section that causes the cylindrically shaped portion to rotate by causing at least the first shaft to rotate, wherein in a case of performing printing on the three-dimensional object having a cylindrically shaped portion, the print object retaining member retains the three-dimensional object by mounting the cylindrically shaped portion either on the first shaft and the second shaft, or on the first shaft and the third shaft, such that when the cylindrically shaped portion is mounted on the first shaft and the second shaft, a side surface of the cylindrically shaped portion is in contact with a side surface of the first shaft and a side surface of the second shaft, the ink jet head is provided at a position facing another side surface of the cylindrically shaped portion of the three-dimensional object Mounted on the first shaft and the second shaft, or on the first shaft and the third shaft, the rotation driving section causes the three-dimensional object to rotate by causing at least the first shaft to rotate, the ink jet head uses:

a base coating head that performs printing of a base coat on the three-dimensional object; and a drawing head that draws on the base coat, the base coating head and the drawing head are arranged so as to be adjoined in a rotation direction in which the cylindrically shaped portion rotates and that intersects perpendicularly with an axial direction of the first shaft, and in a case of projecting to a plane parallel to the axial direction of the first shaft and the rotation direction, a center portion of the base coating head and the drawing head in the rotation direction overlaps with a center axis of the cylindrically shaped portion of the three-dimensional object, such that in view of a gap distance that is a distance between an opening of a nozzle from which the ink jet head discharges the ink droplets and a striking position, the gap distance in the base coating head and the gap distance in the drawing head become substantially equal.

11. An ink jet printer configured to perform printing on a three-dimensional object using an ink jet scheme, the ink jet printer comprising:
an ink jet head that discharges ink droplets; and
a print object retaining section that retains the three-dimensional object by making the three-dimensional object face the ink jet head;
wherein the print object retaining section includes:
a first shaft which is shaped like a shaft extending in a direction that perpendicularly intersects with a direction along which the ink jet head discharges the ink droplets;
a second shaft which is shaped like a shaft extending in parallel with the first shaft; and
a third shaft which is shaped like a shaft that extends in parallel with the first shaft on an opposite side from the second shaft relative to the first shaft, wherein a distance between the first shaft and the second shaft is larger than a distance between the first shaft and the third shaft;
a rotation driving section that causes at least the first shaft to rotate,
wherein in a case of performing printing on the three-dimensional object having a cylindrically shaped portion, the print object retaining section retains the three-dimensional object by mounting the cylindrically shaped portion on the first shaft and the second shaft or on the first shaft and the third shaft, such that a side surface of the cylindrically shaped portion is in contact with a side surface of the first shaft and a side surface of the second shaft, or in contact with a side surface of the first shaft and a side surface of the third shaft,
the ink jet head is provided at a position facing another side surface of the cylindrically shaped portion of the three-dimensional object mounted on the first shaft and the second shaft or mounted on the first shaft and the third shaft, and
the rotation driving section causes the three-dimensional object to rotate by causing at least the first shaft to rotate.

\* \* \* \* \*